US006874278B2

(12) United States Patent
Felknor et al.

(10) Patent No.: US 6,874,278 B2
(45) Date of Patent: Apr. 5, 2005

(54) PLANTER FOR GROWING PLANTS UPSIDE DOWN

(75) Inventors: Wilson A. Felknor, Clinton, TN (US); Jim Ferron, Loudon, TN (US)

(73) Assignee: Felknor Ventures, LLC, Clinton, TN (US)

( * ) Notice: Subject to any disclaimer, the term of this patent is extended or adjusted under 35 U.S.C. 154(b) by 0 days.

(21) Appl. No.: 10/700,062

(22) Filed: Nov. 3, 2003

(65) Prior Publication Data

US 2004/0123522 A1 Jul. 1, 2004

Related U.S. Application Data

(60) Provisional application No. 60/423,695, filed on Nov. 4, 2002.

(51) Int. Cl.[7] .................................. A01G 9/02
(52) U.S. Cl. ........................................... 47/67
(58) Field of Search .................... 47/67, 65.5

(56) References Cited

U.S. PATENT DOCUMENTS 226,922 A * 4/1880 Moses ..................... 220/212
5,333,409 A * 8/1994 Mendes ....................... 47/67
6,058,651 A * 5/2000 Perez ......................... 47/65.8
6,094,861 A * 8/2000 Sandman et al. ............... 47/67
6,298,600 B1 * 10/2001 Feldman ....................... 47/67

FOREIGN PATENT DOCUMENTS

AU    9334065 A * 9/1993 ............ A01G/9/02
GB    2147484 A * 5/1985 ............ A01G/9/02

* cited by examiner

Primary Examiner—Teri Pham Luu
Assistant Examiner—Francis T. Palo
(74) Attorney, Agent, or Firm—Michael E. McKee

(57) ABSTRACT

A planter for growing a transplanted plant upside down utilizes a container having an interior, a bottom and a hole defined within the bottom and further utilizes a retainer member which is attachable to the plant desired to be transplanted within the planter. Furthermore, the retainer member cooperates with the container for supporting the plant through the hole defined within the container bottom so that the root system is exposed to the interior of the container and so that the plant stem extends downwardly from the bottom of the container.

16 Claims, 4 Drawing Sheets

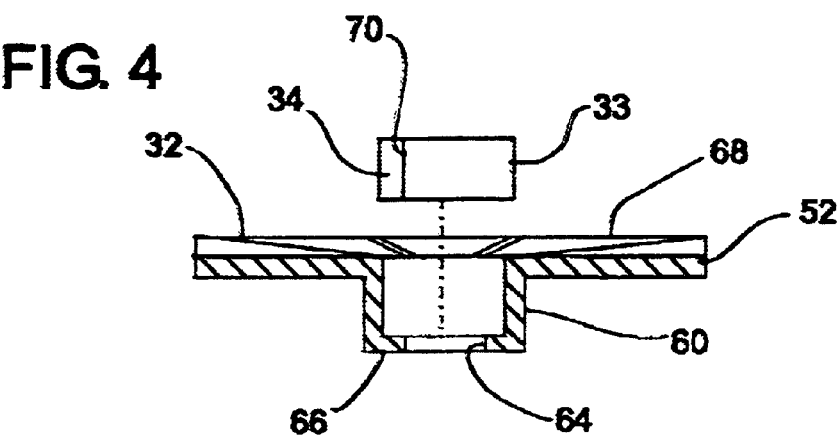
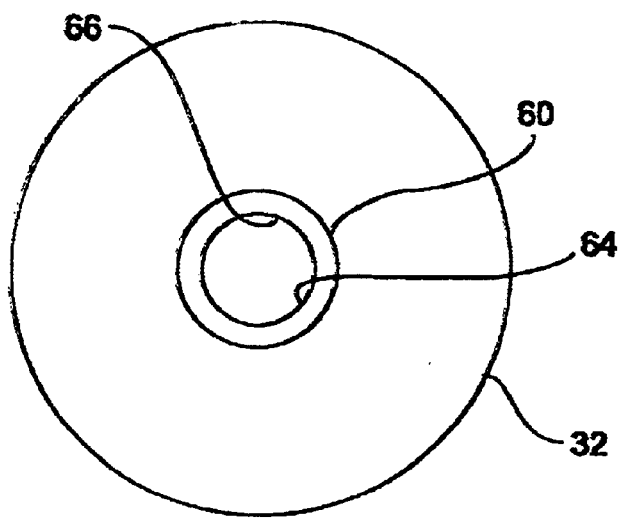
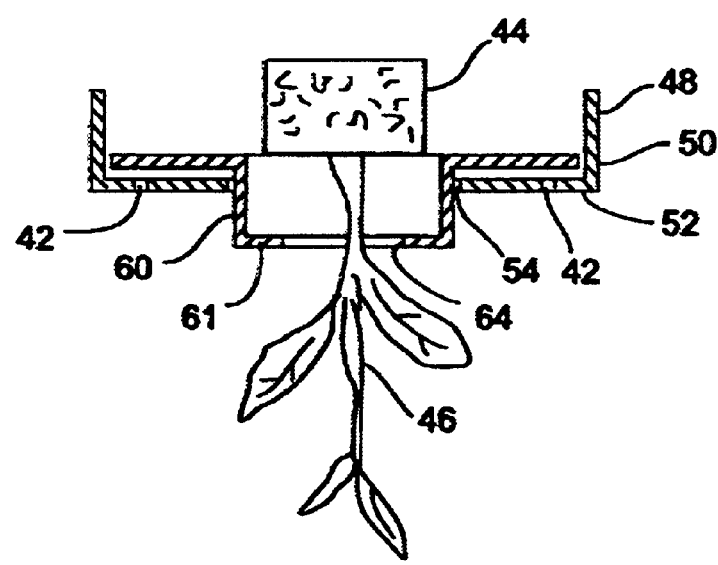

PLANTER FOR GROWING PLANTS UPSIDE DOWN

The benefit of Provisional Application Ser. No. 60/423,695, filed Nov. 4, 2002 and entitled PLANTER FOR GROWING PLANTS UPSIDE DOWN, is hereby claimed. The disclosure of this referenced provisional application is incorporated herein by reference.

BACKGROUND OF THE INVENTION

This invention relates generally to gardening accessories and relates, more particularly, to planters within which plants are transplanted for growth.

The type of planter with which this invention is concerned includes those which are adapted to contain dirt or potting soil and a plant which is transplanted within the potting soil so that the plant continues its growth within the planter.

Accordingly, it is an object of the present invention to provide a new and improved planter within which plants can be transplanted for growth.

Another object of the present invention is to provide such a planter within which plants are transplanted for growth of the plant upside down or, in other words, root-end-up.

Still another object of the present invention is to provide such a planter which can be easily suspended in an elevated condition above the ground for tending of the plant.

Still one more object of the present invention is to provide such a planter wherein the plant being grown therein can be fed and watered with relative ease.

Yet another object of the present invention is to provide such a planter which is readily collapsible to facilitate shipping, packaging and storing of the planter.

A further object of the present invention is to provide such a planter which is uncomplicated in construction yet effective in operation.

SUMMARY OF THE INVENTION

This invention resides in a planter for growing a transplantable plant having a root system and a stem which extends from the root system.

The planter includes a container having an interior, a bottom and a hole defined within the bottom. Furthermore, the planter includes a retainer member which is attachable to the plant desired to be transplanted within the planter and which cooperates with the container for supporting the plant through the hole defined within the container bottom so that the root system is exposed to the interior of the container and so that the plant stem extends downwardly from the bottom of the container.

The planter of this invention presents an interesting, visually-pleasing and enjoyable way to grow garden plants, such as the tomato. Moreover, the planter eliminates the need to dig planting holes, any, dealing with ugly plants (such as the tomato) which would otherwise sprawl across the ground when grown therein, any need to stake the plant, any need to tie up limbs of the plant, any problems with ground insects (such as cutworms and the like), problems with ground fungus and other soil diseases, any problems with nematodes, or any problems due to cyclical watering (and resulting blossom end rot and woody tasting tomatoes).

Moreover, the planter, while suspended in an elevated condition from a support structure at about chest height permits a user to sucker (i.e. remove center growth of the plants from between adjacent stems thereof) while standing adjacent the planter. Thus, the planter provides a means by which plants, such as the tomato, can be pruned with relatively little work and no bending over or working while on the knees.

Further, the planter permits the user to water and fertilize the plant grown within the planter by simply pouring in a mixture of liquid fertilizer and water into a reservoir at the top of the planter on a periodic basis (e.g. about twice a week). Thus, the water which is needed by the plant being grown goes directly to the plant roots, with no dramatic loss due to run-off.

Further still, the planter is versatile in that it is capable of growing flowers, as well as garden plants. Any type of flower, even those which do not cascade, can be grown in the planter upside down. Each flower being grown will curl up and around the planter, searching for light. This allows the user to create a new way to present even an old (e.g. ordinary) variety of flowers in an attractive manner.

Yet still further, the planter can be employed in many additional and special ways, such as growing herbs close to the kitchen in which the herbs will be used. For example, the herbs can be grown in a sunny window in the kitchen or on a nearby deck thus enabling a cook to clip and use the growing herbs as needed. With the large audiences now regularly watching the cooking shows presented on television, a source of fresh herbs is increasing in demand.

BRIEF DESCRIPTION OF THE DRAWINGS

FIG. 4 is a transverse cross-sectional view of the bottom member of the FIG. 1 planter and the retainer member positionable within the bottom member.

FIG. 5 is a bottom view of the FIG. 4 bottom member as seen from below in FIG. 4.

FIG. 7 is a cross-sectional view of the bottom member of FIG. 6, taken about along line 7—7 of FIG. 6 and shown with the plant of FIG. 2 installed therein.

DETAILED DESCRIPTION OF THE ILLUSTRATED EMBODIMENT

Figure 1:
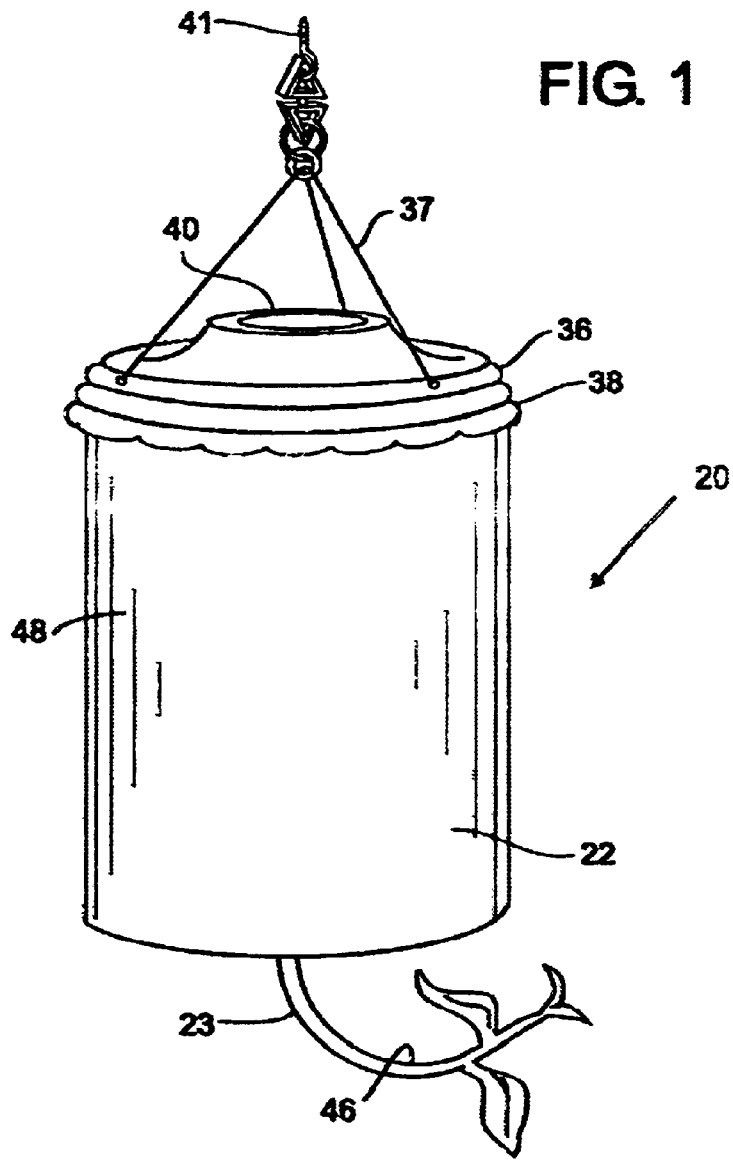
FIG. 1 is a perspective view of a planter within which features of the present invention are embodied.
Figure 2:
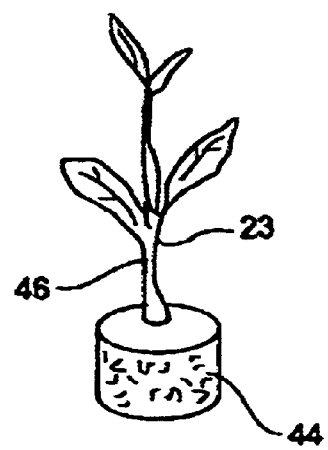
FIG. 2 is a perspective view of an example of a plant capable of being transplanted within the FIG. 1 planter for continued growth of the plant.
Figure 3:
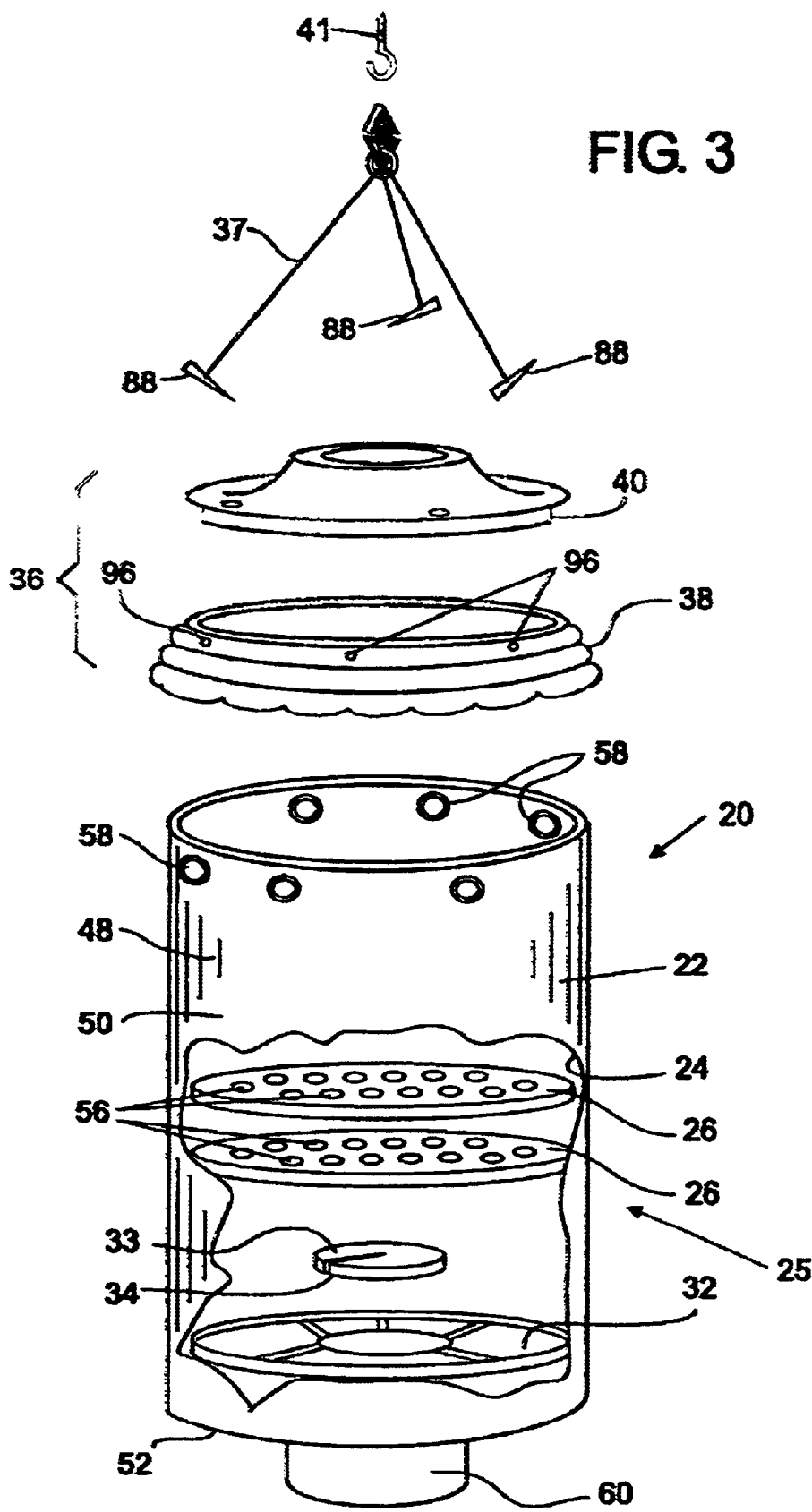
FIG. 3 is a perspective view of the FIG. 1 planter, shown exploded and partially cut-away.

Turning now to the drawings in greater detail and considering first FIGS. 1 and 3, there is shown an embodiment, generally indicated 20, of a planter within which features of the present invention are incorporated. The planter 20 includes a container 22 having an interior 24 and divider means, indicated 25, including at least one divider 26 (two shown in FIG. 2) which is positionable within the container 22 for separating the container interior 24 into a lower compartment and at least one upper compartment. As will be apparent herein, an upper compartment of the container interior 24 provides a cavity within which a soil-less mix can be placed and onto which water and/or fertilizer can be poured while the lower compartment can contain dirt or potting soil and the roots of a plant to be grown within the planter 20. In any event, it is the interior 24 of the container 22 within which materials used for plant growth are placed.

The planter 20 also includes a bottom member 32 which is positionable within the bottom of the container 22 and a retainer member 33 which cooperates (in a manner set forth herein) with the bottom member 32 for supporting the root system of a transplantable plant in an inverted, or root-end-up, orientation within the interior 24 of the container 22. A top assembly 36 including an upper ring member 38 and a funnel insert piece 40 is positionable atop the container 22, and a hanger system 37 is connectable to the upper end of the container 22 for suspending the planter 20 from an elevated support structure (not shown) by way of, for example, a hook 41.

An example of a plant capable of being transplanted into the planter 20 for continued growth of the plant is illustrated in FIG. 2. The depicted plant, indicated generally 23, includes a root system 44 (which commonly is encased in an amount of dirt) and a stem 46 which extends from the root system 44. As will be apparent herein, the retainer member 33 (FIG. 3) is positionable about the stem 46 of the plant 23, and the retainer member 33 is, in turn, supported within the bottom member 32 of the planter 20 so that the root system 44 is positioned within the interior of the container 22 and the (remainder of the) stem 46 extends downwardly and out through the bottom member 32 of the planter 20. With the plant 23 positioned within the planter 20 in this manner, the planter 20 accommodates the continued growth of the plant 23 while the plant 23 is oriented upside down, or in other words, root-end-up.

With reference again to FIGS. 1 and 3, the container 22 is in the form of an open-topped receptacle, or bag 48, including cylindrical sidewalls 50 and a bottom 52 having a center hole 54 (FIG. 7) opening therethrough. Preferably, at least the sidewalls 50 of the bag 48 are flexible in nature to permit the bag 48 (and thus the planter 20) to be collapsed to a relatively flat condition upon the bottom 52 for shipping, packaging or storage of the planter 20. In addition, a plurality of small drain holes 42 (FIG. 7) are disposed within the bottom 52 of the bag 48 to accommodate drainage and help prevent possible root rot.

The material out of which the bag 48 is constructed is preferably a flexible material, such as plastic or fabric, but other materials can be used. For purposes of supporting the container 22 in a suspended condition, there are provided a plurality of (e.g. three) reinforced openings 58 which are regularly spaced about the top of the bag 48. As will be apparent herein, these openings 58 cooperate with the hanger system 37 for supporting the (remainder of the) planter 20 from an elevated support structure.

The bottom member 32 (best shown in FIGS. 3–5) is plate-like in form and is constructed of relatively rigid material, such as stiff plastic, and has a circular recess section 60 formed centrally therein, and the bottom of the recess section 60 includes a center hole 64 so that an inwardly-directed flange 66 encircles the center hole 64. The bottom member 32 is sized to be positionable within the bottom of the bag 48 while the circular recess section 60 is sized to be accepted by the center hole 54 (FIG. 7) formed in the bottom 52 of the bag 48. Therefore and when the bottom member 32 is positioned within the bottom of the bag 48, the recess section 60 protrudes downwardly through the center hole 54 of the container bottom 52. As will be apparent herein, the center hole 64 of the recess section 60 provides the opening through which the stem 46 of the plant 23 extends as the root system 44 is supported within the interior 24 of the container 22. If desired, the bottom member 32 can be reinforced with a plurality of ribs 68 (FIG. 4) extending between the recess section 60 and the periphery of the bottom member 32.

With reference again to FIG. 3, each divider 26 of the divider means 25 is platen-like in shape, porous in nature, and has a diameter which is slightly smaller than that of the bag 48 so that each divider 26 can be positioned within the container 22 to separate the interior thereof into a lower compartment and at least one upper compartment. In the depicted planter 20, each divider 26 is comprised of an open-cell foam material and is provided with a plurality of small drainage holes 56 (FIG. 1) which extend between the upper and lower surfaces of the divider 26.

As mentioned earlier, an upper compartment of the bag 48 provides a cavity within which a soil-less mix can be contained and into which water and/or fertilizer can be poured while the lower compartment is intended to contain dirt or potting soil placed therein, as well as the root system of the plant 23 to be grown within the planter 20. Because of the porous nature of the divider 26, water and/or fertilizer positioned above the lower compartment is permitted to seep downwardly through the divider 26 where it is dispersed through the dirt or potting soil for absorption by the plant 23 through its root system 44. The material out of which each divider 26 is constructed is preferably soft porous foam material, such as a porous polyurethane foam, but other materials can be employed.

With reference to FIGS. 3, 4, 6 and 7, the retainer member 33 of the depicted planter 20 is in the form of a foam body 34 which is substantially cylindrical in form and which is sized to be accepted by the circular recess of the recess section 60 and rest upon the inwardly-directed flange 66 when placed downwardly into the recess section 60, as illustrated in FIG. 4. In addition, the foam body 34 includes a slit 70 which extends from about the center of the body 34 to the outer periphery thereof. By manually spreading the foam body 34 apart at the slit 70 (as illustrated in FIG. 4), the slit 70 is in condition to accept the stem 46 of a plant 23 inserted sideways therein and so that by inserting the plant stem 46 sideways therein and subsequently releasing the foam body 34, the inherent resiliency of the foam body 34 closes the slit 70 about the plant stem 46. With the slit 70 closed about the plant stem 46 in this manner, and the foam body 34 positioned within the recess section 60 of the bottom member 32 (as illustrated in FIG. 7), dirt, potting soil or other material used for plant growth and which is positioned adjacent the root system 44 within the container interior 22 is prevented from falling out of the container 24 through the center hole 64 of the recess section 60. It follows that the foam body 34 acts as a retainer member which cooperates with the bottom member 32 for holding the plant 23 (FIGS. 1 and 2) in an upside-down condition within the bottom of the planter 20.

Figure 8:
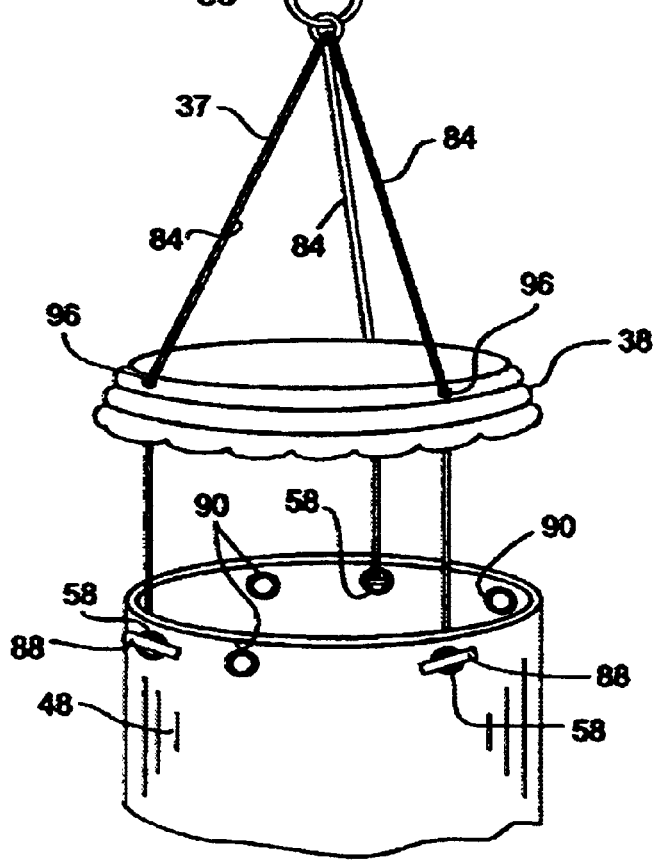
FIG. 8 is a fragmentary perspective view of the FIG. 1 planter, shown with the funnel insert piece removed from the remainder of the planter.

With reference again to FIGS. 1 and 8, the hanger system 37 is attachable to the bag 48 by way of the reinforced openings 58 for suspension of the bag 48 from an elevated support (not shown). In particular, the hanger system 37 includes a plurality of (i.e. three) cable members 84 which are joined together at one end thereof (i.e. the upper end as seen in FIGS. 1 and 8) by way of a closed ring 86 which is adapted to be looped about the hook 41 (FIG. 1) or similar fastener anchored within an overhead structure for suspension of the container 22 therefrom. The hanger system 37 further includes a set of pins 88 which are each joined to the end of a corresponding cable member 84 opposite the ring end thereof. To attach the pins 88 to the container openings 58, each pin 88 is manually oriented alongside its corresponding cable member 84 and then inserted one-end-first through a reinforced opening 58 from the inside of the bag 48. By releasing the pin 88 after its has completely passed through the opening 58, the pin 88 cannot be pulled through the opening 88 by pulling upon the opposite end of the cable member 84.

Figure 9:
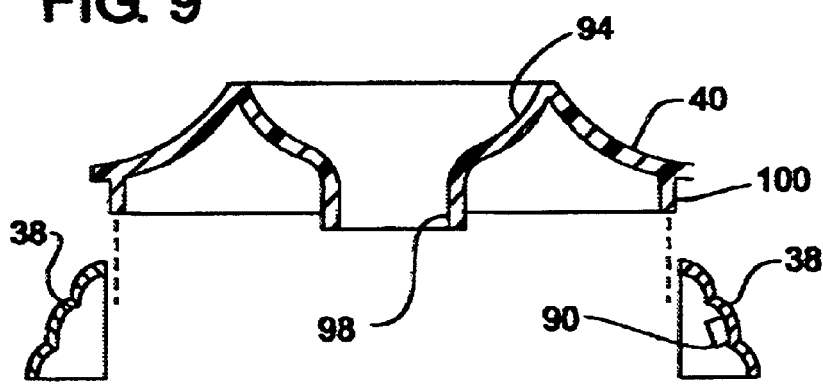
FIG. 9 is a transverse cross-sectional view of the top assembly of the FIG. 1 planter.

With reference to FIGS. 8 and 9, the upper ring member 38 of the top assembly 36 provides a decorative rim for the planter 20 and is positionable atop the bag 48 for supporting the funnel insert piece 40 of the top assembly 36. The ring member 38 is adapted to rest upon the upper edge of the bag 48 as the planter 20 is suspended from an elevated support. If desired, male and female components of snap-type fasteners 90 (FIGS. 8 and 9) can be secured along the upper edge of the bag 48 and the inside surface of the upper ring member 38, respectively, to prevent the upper ring member 38 and bag 48 to be connected to one another in a snap-fit relationship. Such a connection between the upper ring member 38 and bag 48 helps to prevent inadvertent separation between the bag 48 and the upper ring member 38.

In the depicted planter 20, the cable members 84 of the hanger system 37 are intended to pass through preformed holes 96 (FIGS. 1 and 8) provided in the ring member 38 to help secure the ring member 38 in place atop the bag 48 during use of the planter 20. In this connection, each pin 88 of the cable system 37 is initially routed through a corresponding preformed hole 96 before being routed through a corresponding reinforced opening 58 of the bag 48 for attachment thereto.

With reference to FIGS. 1 and 9, the funnel insert piece 40, introduced above, of the top assembly 36 serves as a cover for the container 22 and includes a central funnel-shaped section 94 for funneling water and fertilizer poured therein downwardly to a central opening 98. Furthermore, the funnel insert piece 40 includes an outer edge 100 (best shown in FIG. 9) which can be accepted by the interior of the ring member 38 for support of the funnel insert piece 40 atop the ring member 38. In use, the insert piece 40 can be easily and readily removed from the ring member 38 to expose the mouth of the container 22.

Of the several components of the aforedescribed planter 20, each of the funnel insert piece 40, upper ring member 38, and bottom member 32 are preferably constructed (e.g. molded) out of a hard plastic.

Exemplary dimensions of the planter 20 and its components are as follows: The upper ring member 38 is about ten inches in diameter and the central opening, or mouth, of the upper ring member 38 is about 8.5 inches. Each divider 26 is about 9 inches in diameter and about 0.25 inches thick. The funnel insert piece 40 is about nine inches in diameter, and the central opening 98 thereof is about two inches in diameter. The bottom member 32 is about nine inches in diameter, the central opening 64 of the circular recess section 60 is about 2.5 inches in diameter, and the foam body 34 has a diameter of about 3.5 inches and a thickness of about one inch. The bag 48 is slightly larger than nine inches in diameter, it is about seventeen inches high, and its (bottom) center hole 54 is about 3.625 inches in diameter. Each of the cable members 84 of the hanger assembly 37 is about twenty-one inches long.

Figure 6:
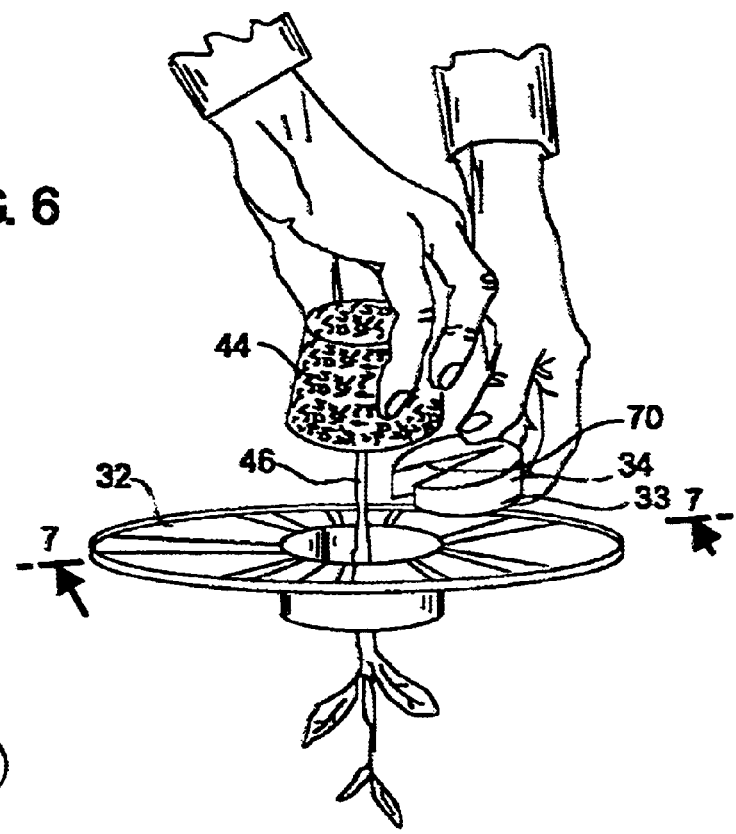
FIG. 6 is a perspective view illustrating the installation, or positioning, of the plant of FIG. 2 into the bottom member of the, FIG. 1 planter.

Assuming the planter 20 is fully assembled (with the dividers 26 and foam body 34 positioned within the container interior 24), the planter 20 can be used in the following manner to transplant a plant 23 therein. First, the planter 20 should be suspended from an overhead support structure by way of the hanger system 37 so that the planter 20 is suspended at a convenient height for working within the container interior 24. Next, the funnel insert piece 40 is removed from the upper ring member 38, and then the dividers 26 and foam body 34 are removed from the container interior 24 through the upper ring member 38. The plant 23 is then inserted root-end-first up through the center hole of the 64 of the recess section 60 of the bottom member 32 until the root system 44 is disposed within the container interior 24 and above the bottom member 32. At that point and as illustrated in FIG. 6, the foam body 34 is held in a manner which spreads the body apart at the slit 70 and its slit 70 is directed over the stem 46 of the plant 23 until the stem 46 is positioned within the slit 70. The foam body 34 is then released so that its slit 70 traps the plant stem 46 within the body 34, and then the plant 23 and foam body 34 is lowered toward the bottom member 32 to position the foam body 34 within the recess section 60 and so that the stem 46 depends downwardly from the planter container 22. It will be understood that when positioned within the recess section 60, the foam body 34 rests upon the inwardly-directed flange 66 thereof.

It is the case with some plants, such as tomatoes, that more than one plant can be positioned within the slit 70 of the foam body 34 for simultaneous growth of the plants. In any event, the foam body 34 holds the plant (or plants) trapped within the slit 70 within the bottom member 32 and provides a plug through which material, such as that used for plant growth, downwardly through the center hole 64.

An amount of materials, such as styrofoam peanuts or gravel, is then placed atop the bottom member 32 to form a shallow layer therein (of about 1.5 inches in depth), and then a soil-less (and preferably well-moistened) mix of, for example, Canadian peat, vermiculite and perlite is carefully placed by hand inside the bag 48 and around the root system 44 of the plant 23. All of the lower open areas within the bottom of the bag 48 should be firmly filled with the soil-less mix. Upon filling the soil-less mix to about one-third up from the bottom of the bag 48, one of the dividers 26 is then be placed on top of the soil-less mix. When placed within the bag 46, Each divider 26 help to keep water and fertilizer properly distributed throughout the compartment disposed beneath the divider 26, and when soil occasionally gets too dry, prevents water from flowing through the divider 26 too rapidly.

Next, well-moistened soil-less mix continues to be added within the bag 48 until the bag 48 is about two-thirds full. The other divider 26 is then placed upon the later-added amount of soil-less mix. Finish filling the bag 48 with the bag 48 with the wet soil-less mix, leaving about a two-inch air gap at the very top of the bag 48. The funnel insert piece 40 is then replaced upon the upper ring member 38, and the planter 20 can be re-hung (if desired) to place or height more desirable than the place or height at which a plant 23 was transplanted into the planter 20.

It will be understood that numerous modifications and substitutions can be had to the aforedescribed embodiment without departing from the spirit of the invention. For example, although the aforedescribed foam body 34 has been illustrated and described as being insertable downwardly into the recess section 60 of the bottom member 32 through the bag 46, a comparable (foam) retainer member can be slightly compressed by hand and then inserted upwardly into the recess section 60 from the underside thereof. Upon release of the (foam) retainer member, the retainer member expands to substantially fill the recess section 60 and rest upon the inwardly-directed flange 66 thereof. Accordingly, the aforedescribed embodiment is intended for the purpose of illustration and not as limitation.

What is claimed is:

1. A planter for growing a transplantable plant having a root system and a stem which extends from the root system, the planter comprising:

a container having an interior, a bottom and a hole defined within the bottom; and a retainer member which is positionable about the stem of the plant desired to be transplanted within the planter and which cooperates with the container for supporting the plant through the hole defined within the container bottom so that the root system is exposed to the interior of the container and so that the plant stem extends downwardly from the bottom of the container;

the retainer member being in the form of a foam body having an outer periphery and which is positionable within the interior of the container so that when positioned about the stem of the plant and positioned within the interior of the container, the retainer member is prevented from falling out of the hole defined within the container bottom, and wherein the foam body has a slit therein which extends from about the center of the foam body to the outer periphery thereof for accepting the stem of the plant desired to be transplanted by spreading the foam body apart at the slit and inserting the plant stem sideways into the slit; and the container includes means associated with the container bottom for surrounding the outer periphery of the foam body so that upon inserting the stem of the plant desired to be transplanted into the slit of the foam body so that the foam body is positioned about the stem of the plant and then positioning the foam body, with the plant stem accepted thereby, into the interior of the container adjacent the bottom thereof while the slit is held in a closed condition about the plant stem, the outer periphery of the foam body is confined within a prescribed area and thereby prevented from expanding outwardly by the associated means so that the slit is prevented from spreading apart from its closed condition about the plant stem.

2. The planter as defined in claim 1 wherein the associated means defines a radially inwardly-directed flange which substantially encircles the hole defined within the container bottom, and the foam body is prevented from falling out of the container bottom through the hole thereof by the radially inwardly-directed flange.

3. The planter as defined in claim 1 further including divider means for separating the interior of the container into an upper compartment and a lower compartment so that materials used for plant growth can be separated from one another within the container interior.

4. The planter as defined in claim 3 wherein the divider means includes a body which is porous in nature for permitting the passage of water and fertilizer from the upper compartment of the container and into the lover compartment thereof.

5. The planter as defined in claim 4 wherein the divider means includes a body of foam material which is sized to span the interior of the container when positioned therein.

6. The planter as defined in claim 4 wherein the divider means includes a multiple of bodies of porous material for dividing the interior of container into a lower compartment and a multiple of upper compartments.

7. The planter as defined in claim 1 wherein the container includes a bag having flexible sidewalls which permit the bag to be collapsed for shipping, packaging and storage.

8. The planter as defined in claim 1 wherein the outer periphery of the foam body is cylindrical in shape, and the associated means includes a circular recess section having sidewalls for nestingly accepting the foam body when the foam body is positioned within the interior of the container so that when the foam body is positioned about the stem of the plant desired to be transplanted and then the foam body, with the plant stem accepted thereby, is positioned within the circular recess section, the foam body spans the entire width of the circular recess section so that the outer periphery of the foam body is prevented from expanding outwardly by the sidewalls of the circular recess section.

9. A planter for growing a transplantable plant having a root system and a stem which extends from the root system, the planter comprising:

a container having an interior for containing dirt or potting soil within which the plant can be grown, a bottom and a hole defined within the bottom; and a retainer member which is positionable about the stem of the plant desired to be transplanted within the planter and which cooperates with the container for supporting the plant through the hole defined within the container bottom so that the root system is exposed to dirt or potting soil contained within the interior of the container and so that the plant stem extends downwardly from the bottom of the container;

the retainer member being in the form of a foam body having an outer periphery and which is positionable within the interior of the container so that when positioned about the stem of the plant and positioned within the interior of the container, the retainer member is prevented from falling out of the hole defined within the container bottom, and wherein the foam body has a slit therein which extends from about the center of the foam body to the outer periphery thereof for accepting the stem of the plant desired to be transplanted by spreading the foam body apart at the slit and inserting the plant stem sideways into the slit; and the container includes means associated with the container bottom for surrounding the outer periphery of the foam body so that upon inserting the stem of the plant desired to be transplanted into the slit of the foam body so that the foam body is positioned about the stem of the plant and then positioning the foam body, with the plant stem accepted thereby, into the interior of the container adjacent the bottom thereof, the outer periphery of the foam body is confined within a prescribed area and thereby prevented from expanding outwardly by the associated means so that the slit is thereby prevented from spreading apart from its closed condition about the plant step.

10. The planter as defined in claim 9 wherein the associated means defines a radially inwardly-directed flange which substantially encircles the hole defined within the container bottom, and the foam body is prevented from falling out of the container bottom through the hole thereof by the radially inwardly-directed flange.

11. The planter as defined in claim 10 further comprising divider means for separating the interior of the container into an upper compartment and a lower compartment so that materials used for plant growth can be separated from one another.

12. The planter as defined in claim 11 wherein the divider means includes a body which is porous in nature for permitting the passage of water and fertilizer from the upper compartment of the container and into the lower compartment thereof.

13. The planter as defined in claim 12 wherein the divider means includes a body of foam material which is sized to span the interior of the container when positioned therein.

14. The planter as defined in claim 12 wherein the divider means includes a multiple of bodies of porous material for dividing the interior of container into a lower compartment and a multiple of upper compartments.

15. The planter as defined in claim 9 further including means for supporting the planter from an elevated support structure.

16. The planter as defined in claim 9 wherein the outer periphery of the foam body is cylindrical in shape, and the associated means includes a circular recess section having sidewalls for nestingly accepting the foam body when the foam body is positioned within the interior of the container so that when the foam body is positioned about the stem of the plant desired to be transplanted and then the foam body, with the plant stem accepted thereby, is positioned within the circular recess section, the foam body spans the entire width of the circular recess section so that the outer periphery of the foam body is prevented from expanding outwardly by the sidewalls of the circular recess section.

\* \* \* \* \*